July 15, 1952 R. A. HOLST 2,603,099
PULLEY STRUCTURE FOR BELT CONVEYERS
Filed Oct. 30, 1950
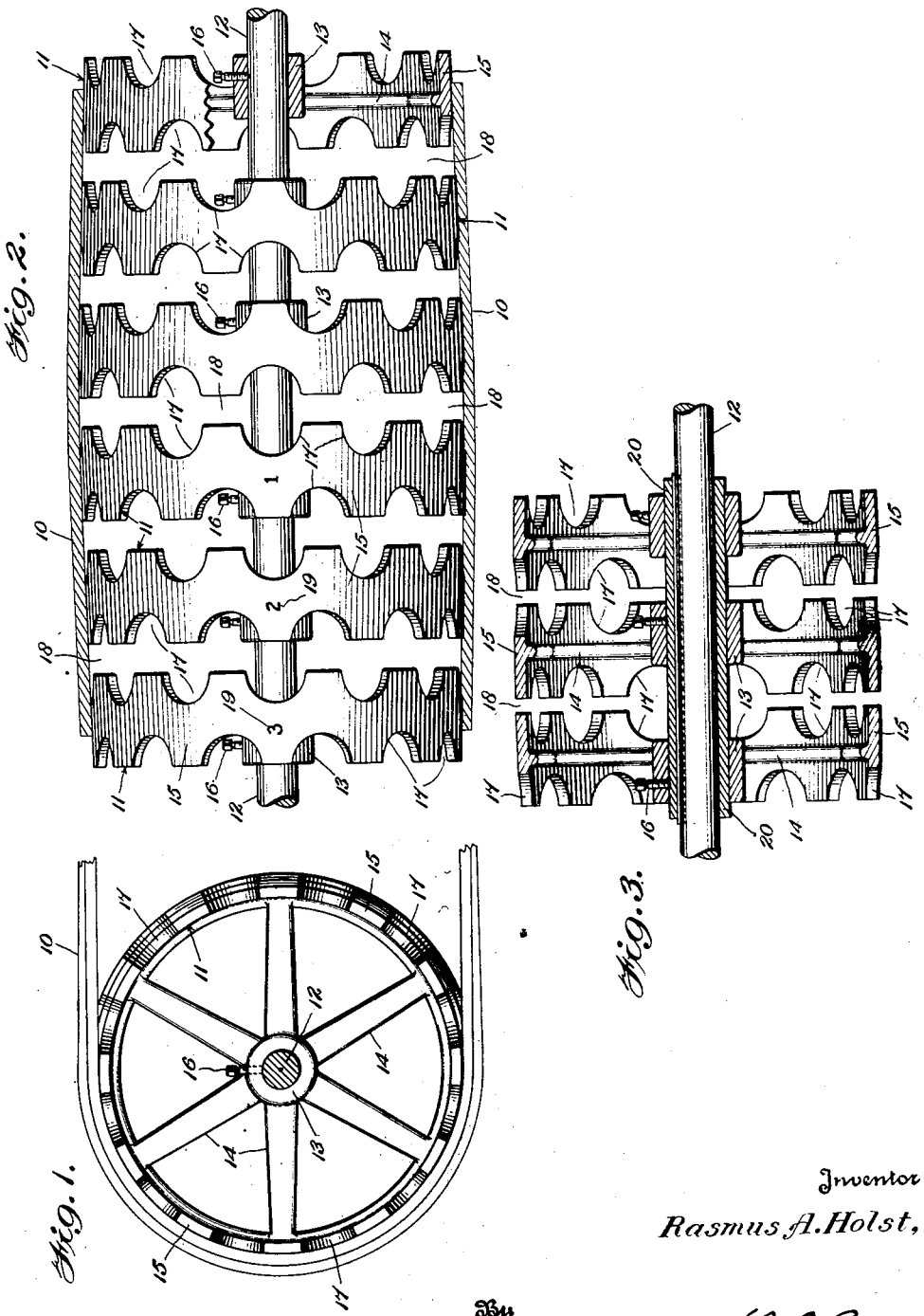
Inventor
Rasmus A. Holst,
By
B.B.Collings
ATTORNEY Patented July 15, 1952

2,603,099

UNITED STATES PATENT OFFICE 2,603,099

PULLEY STRUCTURE FOR BELT CONVEYERS

Rasmus A. Holst, Idaho Falls, Idaho

Application October 30, 1950, Serial No. 192,938

2 Claims. (Cl. 74—230.6)

The invention relates to a pulley structure for use with flat material-conveying belts and the like, and has for its principal object the provision of a simple and relatively inexpensive device of this character providing extreme flexibility as regards its over-all length, whereby it may be readily adapted to belts of various widths. Essentially the structure comprises a plurality of substantially identical elements which may be purchased in such numbers as required to make up an assembly which will properly accommodate a belt of any particular width, which elements may be so assembled by the purchaser. The length of a structure composed of any given number of elements also may be varied, within limits, by variation of the axial spacing of the individual elements, whereby such number of elements may be employed for belts of somewhat different widths; and the construction of the elements is such as not only to tend to reduce slippage between the belt and the pulley structure when the latter is employed to drive the belt, but also to provide for the escape of foreign matter which may be carried to the pulley by the inner face of the belt, and thus prevent undesirable build-up of such matter on the pulley face.

For purposes of disclosure the invention is exemplified in the accompanying drawing forming a part of this specification, in which like reference characters designate like parts in all the views, and in which:

Figure 1 is an end elevational view of a pulley structure constructed and arranged in accordance with the invention;

Fig. 2 is a front elevational view of said structure, partly broken away, as seen from the right of Fig. 1; and Fig. 3 is a longitudinal sectional view of a slightly modified form of the invention.

Referring more particularly to Figs. 1 and 2, there is shown a pulley structure for a flat conveyer belt 10, which structure is composed of six similar elements 11 mounted upon a shaft 12. Each of said elements comprises a bored hub 13 having spokes 14 extending outwardly therefrom and carrying a concentric rim 15. Each hub 13 carries a set screw 16 whereby the element may be fixedly secured to the shaft 12, and each end portion of each rim 15 is provided with a series of circumferentially spaced cut-aways or recesses 17, here shown as of semi-circular shape. The cut-aways at the respective ends of each rim are preferably, although not necessarily, circumferentially staggered relative to one another, as shown in Fig. 2.

The several elements 11 are mounted on the shaft 12 with their rims 15 somewhat axially spaced from one another, thereby providing circumferentially extending apertures or slots 18 between them, through which foreign matter carried to the pulley on the inner face of the belt 10 may be discharged. Such discharge of course may also take place through the apertures provided by the recesses or cut-aways 17 in the rims. The axial spacing of the elements on the shaft may be varied within limits and the over-all length of the structure thus controlled, whereby to adapt a given number of elements to belts of somewhat different widths.

For a flat-faced pulley the elements 11 are all of the same diameter, but if a crowned pulley is desired, elements of slightly different diameters and having the faces of their rims 15 slightly tapered are furnished so that they may be assembled in sets, as shown in Fig. 2, to secure the crowned effect. Such tapered elements are preferably provided with suitable indicia, as at 19, to indicate the order in which they are to be placed upon the shaft.

The elements may be made into pre-assembled units and sold as such, as indicated in Fig. 3, wherein three of them are shown as rigidly mounted on a tube or sleeve 20, which may be keyed or otherwise mounted on the shaft 12. If the mounting be such as to permit rotation of the unit on the shaft, the unit may function as a loose pulley. The sleeve preferably is of such length as to enable the purchaser to adjust the elements thereon and vary the axial spacing whereby to suit the length of the unit to the width of the particular belt with which the device is to be used.

The elements 11 may be assembled either with the rim recesses 17 of adjacent elements in circumferentially staggered relationship as shown in Fig. 2, or with such recesses longitudinally alined as in Fig. 3. In either case, the recesses in conjunction with the spaces 18 between adjacent rims, produce irregular or sinuous circumferentially extending apertures through which, as above mentioned, foreign matter may be discharged, and which also tend to reduce slippage between the belt and pulley.

What is claimed is:

1. In a pulley structure for flat-belt conveyers, the combination with a shaft of a plurality of axially alined circular elements mounted thereon, each of said elements comprising a hub encircling the shaft and a concentric rim, the end portions of which are provided with series of circumferentially spaced cut-aways, said elements being disposed upon the shaft with said rims longitudinally spaced from one another and with the cut-aways of adjacent rims circumferentially staggered relative to one another, whereby such cut-aways in conjunction with the spacing of the rims provide irregular circumferential apertures in the pulley face which tend to reduce slippage between the belt and the pulley structure, and through which foreign matter carried by the inner face of the belt may be discharged to prevent build-up thereof on the pulley face; and means for rigidly securing said elements to the shaft.

2. An element for a multiple-unit pulley structure as recited in claim 2, said element comprising a bored hub and a concentric rim rigidly carried thereby, the end portions of said rim being provided with series of circumferentially spaced cut-aways extending completely through the rim radially and imparting a substantially sinuous conformation to said end portions.

RASMUS A. HOLST.

REFERENCES CITED

The following references are of record in the file of this patent:

UNITED STATES PATENTS

| Number | Name | Date |
| --- | --- | --- |
| 507,467 | Vautin | Oct. 24, 1893 |
| 605,104 | Knoblock | June 7, 1898 |
| 805,238 | Shackleton | Nov. 21, 1905 |